United States Patent [19]

Hiraoka et al.

[11] Patent Number: 5,271,301
[45] Date of Patent: Dec. 21, 1993

[54] VIBRATING CUTTING TOOL

[75] Inventors: Masaaki Hiraoka; Yasuo Umemura; Osamu Date; Tsutomu Aoki; Fukuo Wakano; Hitomi Nakai, all of Osaka, Japan

[73] Assignee: Nippon Pneumatic Manufacturing Co., Ltd., Osaka, Japan

[21] Appl. No.: 946,143

[22] Filed: Sep. 17, 1992

Related U.S. Application Data

[60] Division of Ser. No. 603,115, Oct. 25, 1990, which is a continuation-in-part of Ser. No. 405,173, Sep. 11, 1989, abandoned, which is a continuation-in-part of Ser. No. 161,639, Feb. 29, 1988, abandoned.

[30] Foreign Application Priority Data

| May 28, 1987 | [JP] | Japan | 62-135658 |
| Jul. 16, 1987 | [JP] | Japan | 62-110557 |
| Feb. 29, 1988 | [JP] | Japan | 62-322221 |

[51] Int. Cl.$^5$ .................................. B23B 27/22
[52] U.S. Cl. ...................... 82/158; 82/904; 407/6
[58] Field of Search ............ 409/231, 232, 234, 131, 409/132; 408/17, 139, 142, 714, 1 R; 82/904, 158, 1.11; 279/16; 74/22; 407/6, 7

[56] References Cited

U.S. PATENT DOCUMENTS

| 1,334,898 | 3/1920 | Gyllsdortt | 279/16 |
| 2,460,210 | 1/1949 | Barrett | 279/16 |
| 3,056,320 | 10/1962 | Findley | 29/DIG. 46 |
| 3,454,283 | 7/1969 | Benjamin et al. | 279/16 |
| 4,088,418 | 5/1978 | Dann | 408/139 |

FOREIGN PATENT DOCUMENTS 0030606  6/1981  European Pat. Off. ............ 82/904

*Primary Examiner*—Z. R. Bilinsky
*Attorney, Agent, or Firm*—Nikaido, Marmelstein, Murray & Oram

[57] ABSTRACT

A vibrating cutting tool capable of making uniform micro-vibrations at the cutter edge generated during machining. The vibrations at the cutter edge are transmitted to balls biassed by springs, compressing the springs. The vibrations are transmitted from the balls through the output shaft back to the cutter edge. While the cutting force is small, the amplitude of vibration of balls is relatively large. When it increases, the holder acts on the balls more than the spring does so that vibration is suppressed. As a result, the amplitude of vibration becomes uniform.

3 Claims, 6 Drawing Sheets

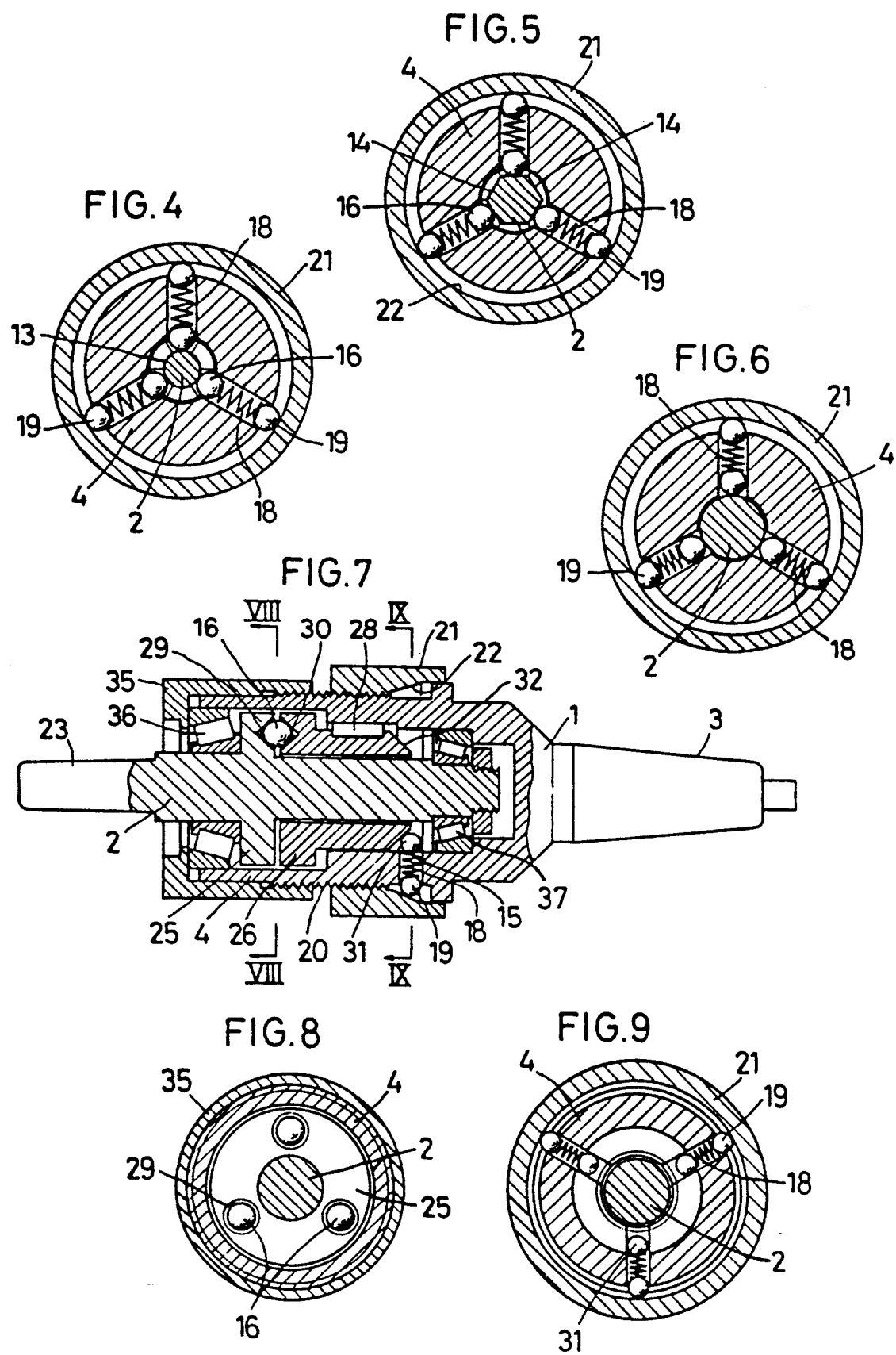

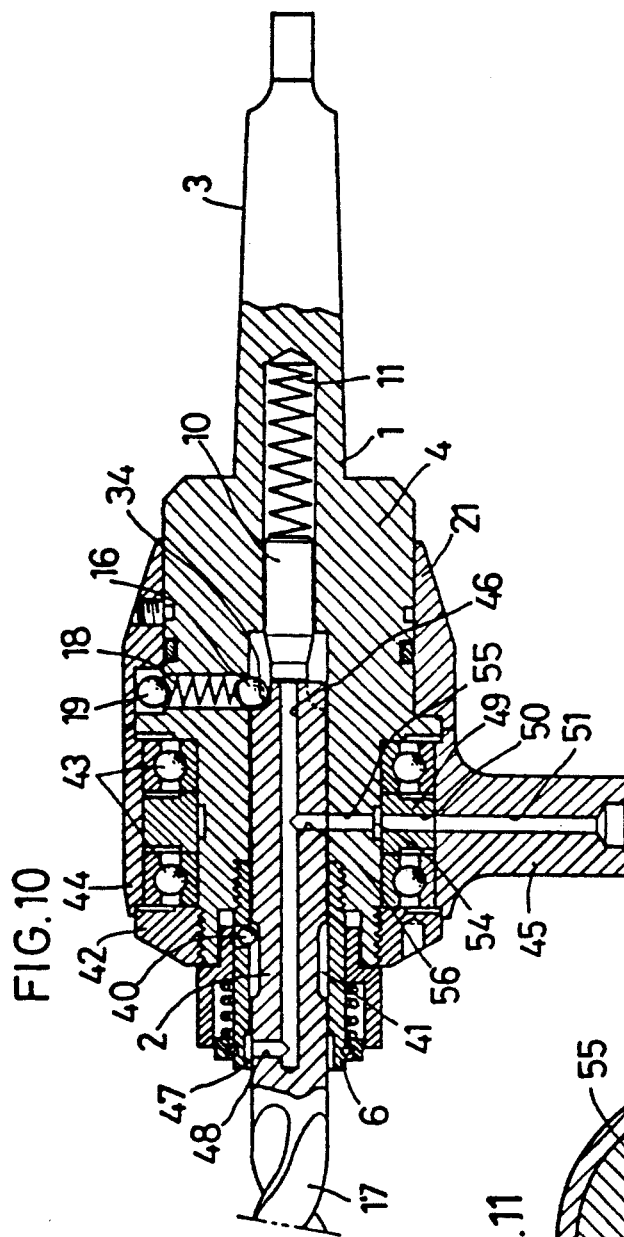

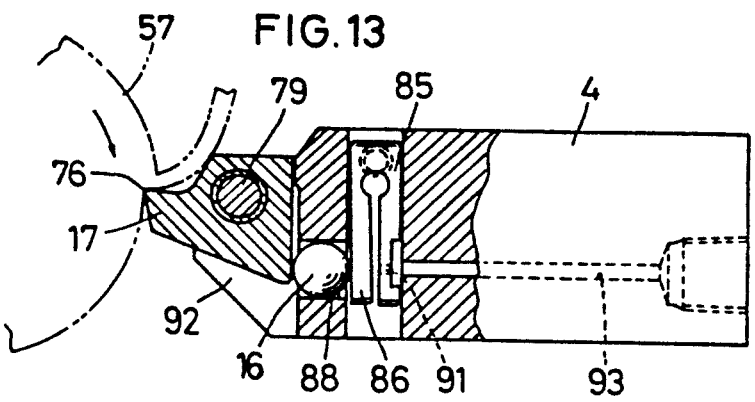
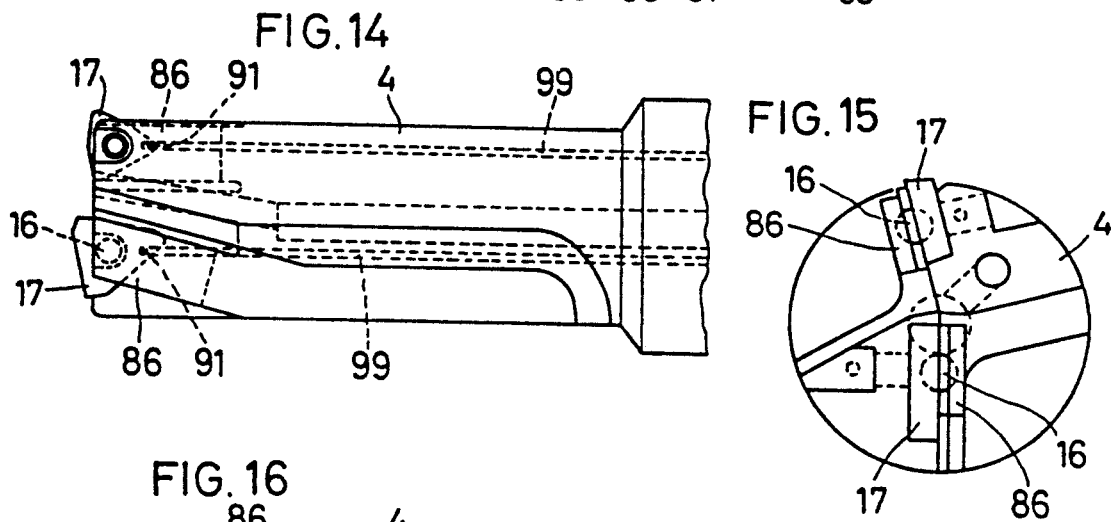
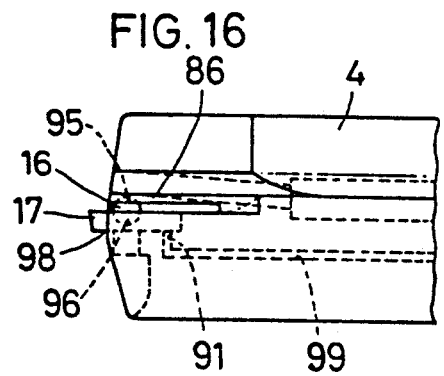
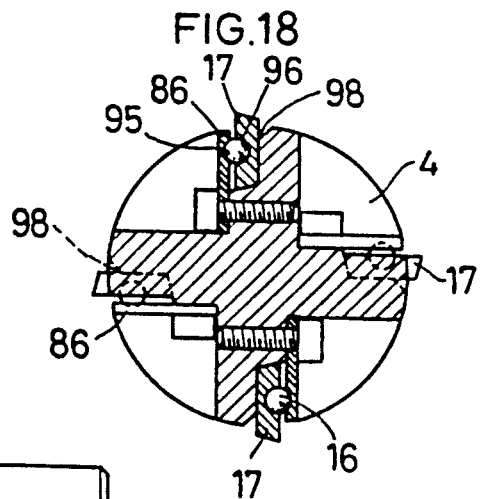
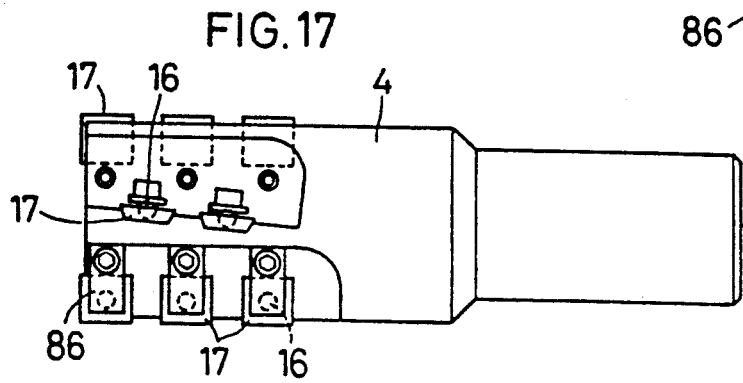

VIBRATING CUTTING TOOL

This application is a division of application Ser. No. 603,115 filed Oct. 25, 1990, which in turn is a continuation-in-part application of application Ser. No. 405,173, filed Sep. 11, 1989, now abandoned, which in turn is a continuation-in-part of application Ser. No. 161,639, filed Feb. 29, 1988, now abandoned.

BACKGROUND OF THE INVENTION

The present invention relates to a vibrating cutting tool adapted to impart vibrations effective for cutting to a rotary cutter such as a drill or a mill.

FIG. 19 shows how the work A made of a metallic material is machined with the edge B of a cutter. Let us suppose that the cutter is moving to the lefthand side of the figure. Letter C designates the chip produced by machining.

Viewing in a minute scale, the cutter edge B proceeds in the direction of arrow not smoothly but discontinuously in a stop-and-go manner to alternately compress and shear the work. The chip C thus produced is composed of a plurality of blocks C' piled one upon another.

The vibration produced by such stop-and-go motion of the cutter edge during cutting is called self-induced vibration. Ordinarily, it has an extremely minute amplitude but such a cutting can be regarded as vibration cutting in a broad sense. If its amplitude exceeds a certain point, however, such vibration becomes chattering.

FIG. 21A shows a waveform during a conventional cutting state as described above. It is very irregular. Heat tends to build up at portions where waves are small and the work tend to have scratches formed at portions where they are large. This will worsen the surface roughness.

There is also known another type of vibrating cutting tool in which the cutter is forced to vibrate so as to cut the work by giving uniform vibrations to the cutter as shown in FIG. 21B. Such a cutting tool has excellent cutting characteristics.

But, as a vibration generator, an electrostriction or magneto-striction type vibrator excited by an oscillator have been used. Other types such as an electromagnetic type, electro-hydraulic type and mechanical-hydraulic type are also known. Such conventional means for vibrating a cutter need a complicated circuit or a large-sized, complicated and costly device such as a hydraulic cylinder.

SUMMARY OF THE INVENTION

It is an object of the present invention to provide a cutting tool which can convert irregular vibrations produced at the cutter edge as shown in FIG. 21A into vibrations having uniform waveforms as shown in FIG. 21C without using any device for producing vibrations by force, exhibiting excellent cutting performance.

In accordance with the present invention, there is provided a vibrating cutting tool comprising an input shaft driven by a spindle of a machine tool, a cutter holder fixedly mounted on the input shaft so as to rotate with the input shaft, the cutter holder having an axial center hole and a plurality of radial holes communicating with the center hole, an output shaft rotatably received in the center hole and formed with an engaging surface so that during normal machining, the engaging surface will be located close to the radial holes, a cutter mounted on the output shaft so as to vibrate during machining, spring means mounted in the respective radial holes and ball means disposed in the respective radial holes and biassed by the spring means so as to be pressed against the output shaft on the engaging surface, whereby transmitting torque from the input shaft to the output shaft and thus to the cutter.

The input shaft is fixed to the spindle of a machine tool and rotated with the spindle while being moved forward together with the input shaft to press a cutter fixed to the tool mounting shaft against the work to cut it.

Irregular micro-vibrations are produced at the cutter edge during cutting due to changes in the cutting stress. Such vibrations are transmitted to the output shaft, balls and springs.

The vibrations produced at the cutter edge are quite irregular as is apparent from their waveform shown in FIG. 21A. As the output shaft vibrates, the balls biassed by the springs vibrates.

While the cutting force is small, the movement of the balls and the compression of the springs are small. Thus, the spring constant acting on the vibrating unit including the balls is also small. In this state, because the input shaft and thus the cutter edge can vibrate fairly freely, the amplitude of vibration tends to be relatively large.

As the cutting force and thus the compression of the springs increase, the spring constant of the entire vibrating unit increases, thus restricting the amplitude of vibration at the cutter edge. Thus, small vibrations are amplified in a sense relative to prior art devices whereas large vibrations are suppressed, so that the vibration at the cutting edge becomes uniform as a whole.

With this arrangement, the cutter edge can vibrate with a larger amplitude than with a conventional type in which vibrations are forcibly produced and the vibrating frequency can be kept substantially uniform though it is relatively low. This makes it possible to increase the cutting speed and utilize the vibrations at the edge of the cutter effectively.

Also, the roughness of the finished surface will reduce and the dimensional accuracy improve. By the provision of the torque limiter function, if an abnormal torque occurs, the torque transmission from the input shaft to the output shaft can be cut off so as to prevent the breakage of the cutter.

Further, use of the self-induced vibration makes it possible to simplify the construction of the tool remarkably in spite of such an excellent vibration cutting effect.

Other features and objects of the present invention will become apparent from the following description taken with reference to the accompanying drawings, in which:

BRIEF DESCRIPTION OF THE DRAWINGS

FIG. 4 is a cross-sectional view taken on line IV—IV of FIG. 1;

FIG. 5 is a similar view taken on line V—V of FIG. 2;

FIG. 6 is a similar view taken on line VI—VI of FIG. 3;

FIG. 7 is a partial vertical sectional side view of the second embodiment;

FIGS. 8 and 9 are cross-sectional views taken on line VIII—VIII and line IX—IX of FIG. 7, respectively;

FIG. 10 is a vertical sectional side view of the third embodiment;

FIG. 11 is a vertical sectional front view of the same;

FIG. 12 is a vertical sectional side view of the fourth embodiment;

FIG. 13 is a similar view of the fifth embodiment;

FIG. 14 is a side view of the sixth embodiment;

FIG. 15 is a front view of the same;

FIG. 16 is a plan view of the same;

FIG. 17 is a side view of the seventh embodiment;

FIG. 18 is a vertical sectional front view of the same;

DETAILED DESCRIPTION OF THE PREFERRED EMBODIMENTS

Figure 1:
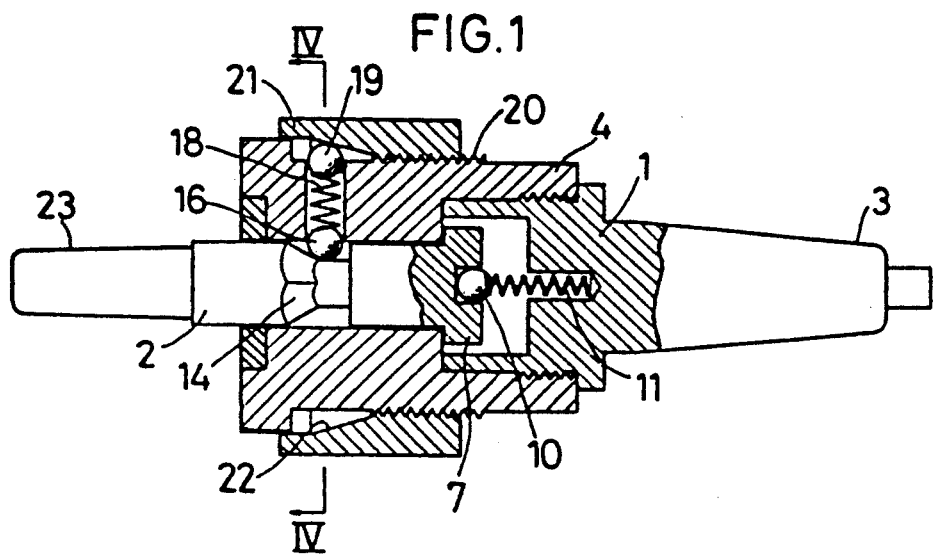
FIGS. 1 to 3 are partial vertical sectional side views of the first embodiment of the cutting tool according to the present invention.

Now referring to FIGS. 1 to 6 which show the first embodiment of the present invention, numerals 1 and 2 designate an input shaft and an output shaft, respectively. The input shaft is formed with a tapered shank 3 at its rear part. A cylindrical cutter holder 4 is fixed to the front portion of the input shaft 1 by threaded engagement.

The output shaft 2 has its rear part rotatably and reciprocably received in a small-diameter bore 5 in the front part of the cutter holder 4 with its large-diameter rear end 7 housed loosely in a large-diameter bore 8 formed in the rear part of the cutter holder.

The output shaft 2 is formed in its rear end face at the center with a recess to receive a ball 10 biased forwardly by a spring 11 mounted in a center hole formed in the front end face of the input shaft 1. The ball 10 serves as a seat for the spring 11.

The output shaft 2 is also formed at a portion received in the holder 4 with an annular groove 12 having its bottom 13 shaped with a small-diameter cylindrical periphery coaxial with the output shaft 2. The annular groove 12 has its rear side wall flat and rising at a right angle with respect to the axis of the output shaft and its front side wall formed with a tapered polygonal surface 14.

The holder 4 is formed in its front part with a plurality of radial holes 15. At the inner end of each radial hole 15 is loosely mounted a ball 16 in contact with the output shaft 2. The ball 16 is biassed by a spring 18 having its rear end supported by balls 19 which serve as mere seats for the springs.

A torque adjusting sheath 21 is in threaded engagement with the holder 4 with a male thread 20 formed on the outer periphery of the holder 4 so as to be movable back and forth with respect to the holder by turning it. The adjusting sheath 21 has its inner periphery 22 tapered front-wide to support the balls 19 thereon.

In operation, the input shaft 1 is fixed at its tapered shank 3 to a spindle of a machine tool. A cutter (not shown) such as a drill is fixedly mounted on a mounting portion 23 at the head of the output shaft 2. The cutter cuts into a work as the spindle advances while rotating.

When the cutting tool is at a position shown in FIGS. 1 and 4 (wherein the cutter is not in contact with the work), the balls 16 are in contact with the bottom 13 of the annular groove 12, so that the torque of the input shaft 1 will not be transmitted to the output shaft 2.

Figure 2:
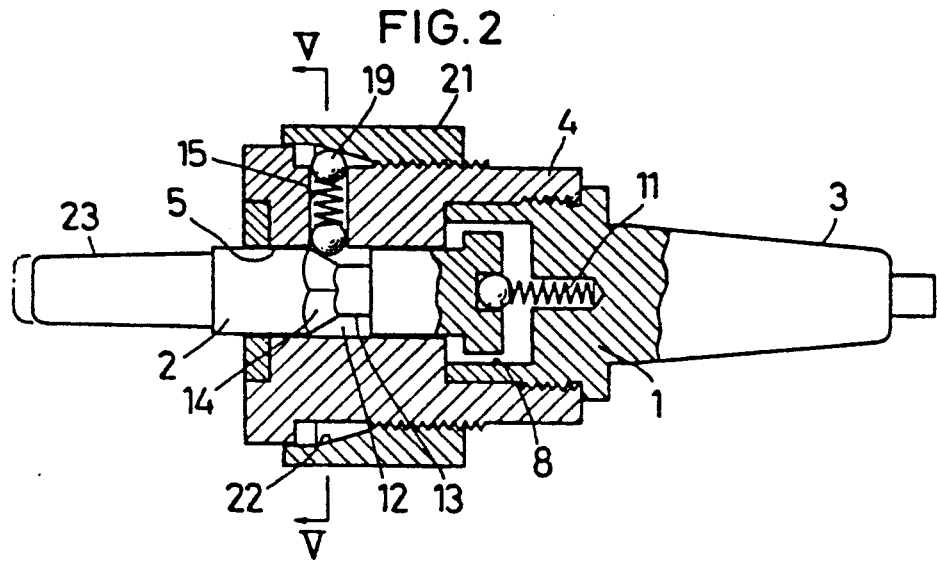

When the input shaft 1 further moves forward until the cutter abuts the work, the spring 11 will be compressed and the balls 16 will ride on the tapered surface 14 as shown in FIGS. 2 and 5. The input shaft 1 thus engages the output shaft 2, transmitting its torque to the latter to start cutting the work.

The cutter vibrates with an extremely small amplitude at its edge while cutting into the work. The vibrations at the cutter edge are transmitted to the output shaft 2.

Figure 20:
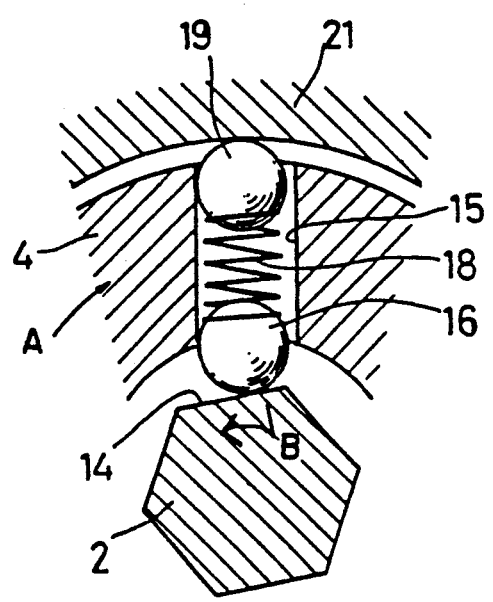
FIG. 20 is an enlarged sectional view of one of the balls showing how it operates.
Figure 21A:
FIGS. 21A to 21C are waveforms of vibrations in the conventional device and the device of the present invention.
Figure 21B:
Figure 21C:

While the holder 4 integral with the input shaft 1 is in rotation in the direction of arrow A of FIG. 20, the balls 16 arranged at the inner end of the radial holes 15 will be pressed against the tapered surface 14 on the output shaft 2, so that the turning torque is transmitted from the input shaft 1 to the output shaft 2.

While the amplitude of the vibration at the cutter edge is small, the amplitude of vibration of the output shaft 2, that is, the range of relative rotation of the output shaft 2 with respect to the input shaft 1 (shown by arrow B) is also small. In this state, the minute vibration produced at the cutting edge is transmitted to the balls 16 from the output shaft 2 to the springs 18 and back to the cutting tool. This is because while the amplitude of vibration is small, the polygonal surface 14 on the output shaft 2 is in contact with the balls 16 at an angle substantially perpendicular to the springs 18 and thus the torque acts on the balls 16 at a smaller angle with respect to the axis of the springs 18. Since in this state the vibration is transmitted through the spring 18 having a small spring constant, its amplitude is kept relatively large.

When the amplitude of vibration at the cutter edge increases, the output shaft 2 vibrates to a greater degree. In other words, the range of relative rotation with respect to the input shaft 1 (in the direction of arrow B) increases. Thus the polygonal surface 14 will incline to a larger degree with respect to the axis of the springs 18. As the angle of inclination of the polygonal surface 14 increases, the balls 16 will be pressed against the walls of the radial holes 15 with an increasing force. This means that torque is now transmitted from the ball 16 mainly to the holder 4 rather than to the springs 18. In this state, the holder 4 and the input shaft 1 integral with the holder 4 act as a spring having much greater spring constant than the spring 18. Thus the amplitude of vibration will be suppressed considerably.

Thus, according to the present invention, while the amplitude of vibration at the cutter edge is small, the springs 18 mainly act, allowing the cutter to vibrate relatively freely. When the amplitude of vibration increases, the holder 4 and the input shaft 1, which have a large mass, mainly act as a spring having a large spring constant, suppressing the vibration. As a result, the amplitude of the tool vibration becomes uniform as a whole.

Figure 22:
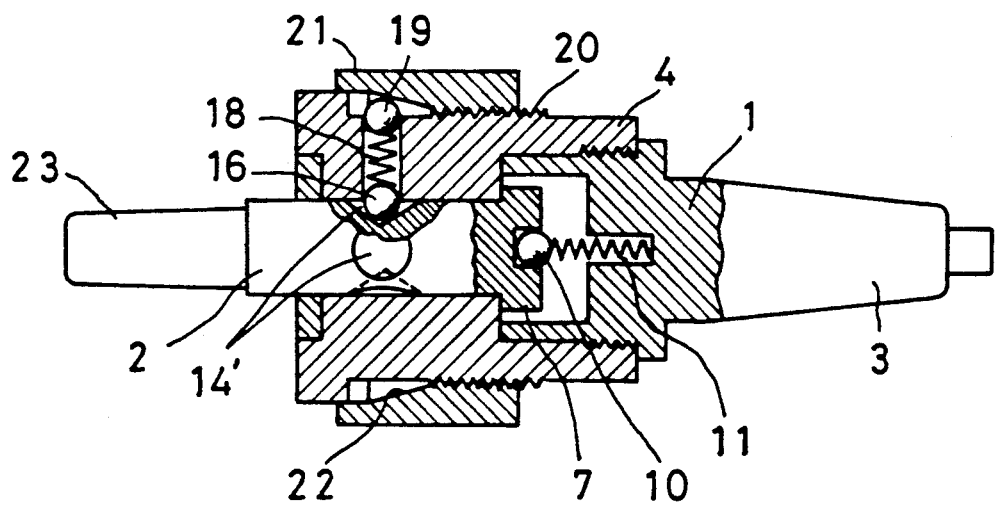
FIG. 22 is a vertical sectional view of a variant of the first embodiment.

FIG. 22 shows a variant of the first embodiment in which the output shaft 2 is formed with four conical recesses 14' to receive the balls 16 urged by the springs 18 instead of being formed with the polygonal surface 14. The operation of the variant is substantially the same as in the first embodiment.

If during cutting the output shaft 2 should be subjected to an abnormal torque for some reason, the springs 18 would be compressed to allow the balls 16 to ride over the tapered surface 14 onto the outer periphery of the output shaft 2, disengaging the output shaft 2 from the input shaft 1. Thus, the torque of the input shaft 1 is not transmitted to the cutting tool, preventing the cutter from being destroyed.

Figure 3:
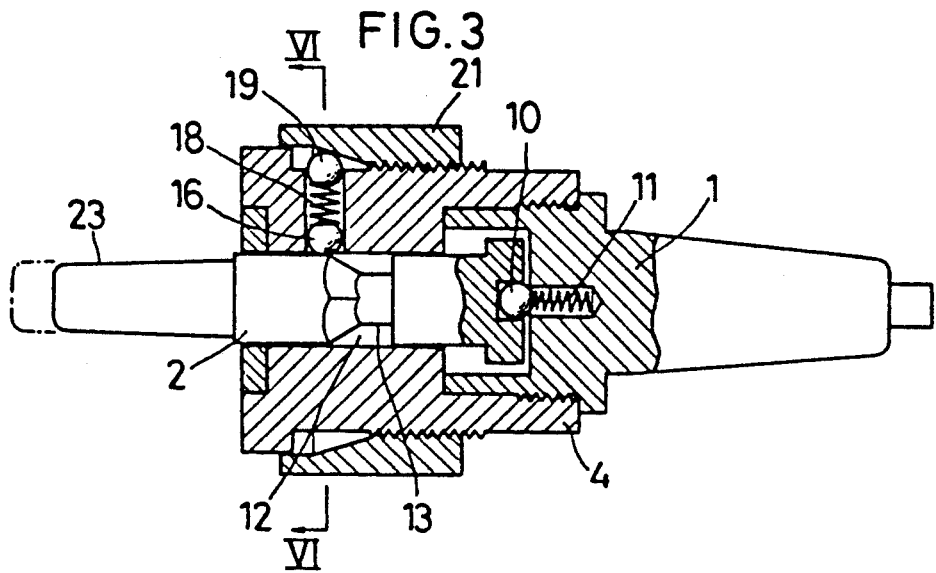
Figure 19:
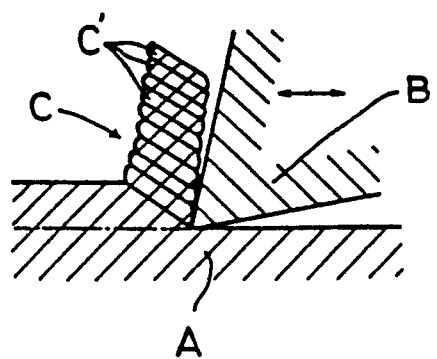
FIG. 19 is an enlarged sectional view of a cutter showing how the work is machined.

Also, if the feed of the input shaft is too high compared with the cutting speed by the cutter, the output shaft 2 will retract into the cutter holder 4, until the balls 16 ride onto the outer periphery of the output shaft 2 as shown in FIGS. 3 and 6. Thus, the output shaft gets freed from the torque as well as the axial movement of the input shaft, preventing the cutter from breaking. It will be now understood that the arrangement of the present invention acts as a torque limiter, too.

FIGS. 7 to 9 show the second embodiment in which like numerals indicate like parts of the first embodiment.

In this embodiment, the output shaft 2 is formed at its intermediate portion with a flange 25. A cylindrical sheath 26 is slidably mounted on the output shaft 2 at the rear part of the flange 25. The sheath 26 is coupled to the holder 4 through a slide key 28 so as to be axially slidable but not rotatable with respect to the holder 4.

A plurality of tapered recesses 29 and 30 are formed in the rear end face of the flange 25 and in the front end face of the sheath 26, respectively. A ball 16 is engaged in each pair of recesses 29 and 30.

The cutter holder 4 is provided with a plurality of radial holes 15. A ball 31 is provided at the inner end of each hole so as to be in contact with a tapered surface 32 formed on the outer periphery of the rear end of the sheath 26.

A bearing fixing sheath 35 is mounted on the holder 4 to cover its front part and fixed thereto by the engagement between a female thread formed on the former at its rear end and the male thread 20 on the latter. A tapered bearing 36 is provided between the fixing sheath 35 and the flange 25. Another tapered bearing 37 is provided between the rear of the holder 4 and the rear end of the output shaft 2.

As for the operation of the second embodiment, FIG. 7 shows the condition where the balls 16 are received in the tapered recesses 29 and 30, engaging the input shaft 1 with the output shaft 2. Thus, the torque of the input shaft 1 is transmitted to the output shaft 2, producing microvibrations at the cutter edge, which are transmitted to the balls 16, and back to the cutter edge.

If the output shaft 2 should undergo an abnormal torque, the balls 31 will be pushed outwardly to compress the springs 18, allowing the sheath 26 to move rearwardly. Also, the balls 16 are now disengaged from the tapered recesses 29 and 30, causing the input shaft 1 to run idle. This torque limiter function protects the cutter against damage.

Both in the first and second embodiments, the torque adjusting sheath 21 is adapted to be moved back and forth by turning it to adjust the pressure exerted on the springs 18 through the tapered surface 22 and the balls 19. Thus, the torque transmitted to the output shaft is adjustable.

If the cutter is a general purpose drill, it is necessary to impart vibrations in the direction of its axis as well as in the direction of rotation. If the cutter is for machining a soft material, it is only necessary to give axial vibrations. In case of an end mill, the cutter has to be vibrated only in the direction of rotation.

Accordingly, it is preferable to provide a suitable means for disabling either the balls which tend to vibrate axially or the ones which tend to vibrate in the direction of rotation, as necessary.

In the first and second embodiments, the machine tool is stopped after it has been confirmed visually that the cutter has stopped.

If the cutting tool is provided with an abnormal torque detector, it should be adapted to signal a warning and cause the machine tool to stop upon detecting any abnormal torque.

FIGS. 10 and 11 show the cutting tool of the third embodiment provided with an abnormal torque detector. The parts having the same or similar construction and function as those of the first embodiments shown in FIGS. 1 and 5 bear the same numerals.

In this embodiment, the input shaft 1 is integrally formed with a cutter holder 4 having its front portion prolonged. A torque adjusting sheath 21 is mounted on the rear of the holder 4. A stopper nut 42 is fixed to the front end of the holder 4 by threaded engagement. A retainer ring 44 is interposed between the torque adjusting sheath 21 and the stopper nut 42 through a pair of bearings 43 so as to be rotatable but not reciprocable. A bracket 45 is provided integrally with the ring 44.

The output shaft 2 is formed with a vent hole 46 extending from its rear end to a predetermined depth. To the front end of the holder 4 is integrally secured a tubular portion 6 having its front end face cut out along its inner circumference to form an annular gap 47 having its front end open. The output shaft 2 is formed with a radial exhaust hole 48 so that the vent hole 46 will communicate with the gap 47.

Between the bearings 43, there is provided a ring-like distance piece 49 formed with a radial hole 50 communicating with a hole 51 formed in the bracket 45. The holder 4 is formed in its front outer peirphery with an annular groove 54 communicating with the radial hole 50 in the distance piece 49.

The holder 4 is also formed in its front portion with a plurality of radial holes 55 having their outer ends communicating with the annular groove 54. (FIG. 11) The output shaft 2 is formed with a radial hole 56 adapted to communicate with the radial holes 55. A lock ball 40 is loosely mounted in a radial hole formed in the tubular portion 6 to rotatably mount the cutter by the engagement of the lock ball in the groove. An annular groove 41 is formed in the cutter 17.

In operation, the input shaft 1 is fixed at its tapered shank 3 to a spindle of a machine tool so that the bracket 45 will be coupled to a stationary portion (not shown) of the machine tool by a coupling means (not shown) and the hole 51 will open to an airway leading to a pressurized air source (not shown). A pressure sensor is provided in the airway.

The pressurized air flows through the communicating holes 51 and 50 and the annular groove 54 into the radial holes 55 formed in the holder 4 which is revolving together with the cutter 17. The pressurized air then flows through the radial hole 56 and the vent hole 46 to be released into the atmosphere through the exhaust hole 48.

During a normal cutting opeartion, the radial holes 55 and 56 are aligned together to allow the pressurized air to be exhausted from the exhaust hole 48. If the cutter is under abnormal torque, the radial holes 55 and 56 will get out of true, causing the air pressure in the airway to rise sharply. The pressure sensor will detect the abnormal increase in pressure and signal the abnormality of the tool.

Alternatively, the pressurized air may be sealed up during normal cutting operations and if there is anything abnormal, the pressurized air may be exhausted through the holes 55, 56 to allow the pressure sensor to detect the drop in the air pressure.

In the fourth embodiment shown in FIG. 12, the cutter holder 4 has a square section so as to be fixed to a tool post of a lathe (not shown) and is formed in its front top surface with a cutout 77 on which is mounted a cutter 17.

The cutter 17 is formed in its top surface with a groove 78 having a semicircular section and laterally extending across its central part. A pin 79 is rotatably received in the groove 78. A brace 80 has its rear portion fixed to the holder 4 by means of a bolt 82. The upper half of the pin 79 is received in a groove 81 of a semicircular section formed in the front bottom surface of the brace 80.

There are formed gaps a and b between the bottom surface on the cutter 17 and the top of the holder 4 at its front end and between the top surface on the cutter 17 and the bottom surface of the brace 80, respectively. The gaps a and b permit the vertical pivotal movement of the cutter 17 about the pin 79. But the cutter is free from play both in longitudinal and transverse directions because of snug fit of the pin 79 in the grooves 78 and 81 and the abutment with the sides of the cutout 77.

The holder 4 is formed with a longitudinal bore in which is mounted a longitudinally slidable spring member 85 formed in its front end with a slit of a predetermined depth. Its portion over the slit serves as a spring 86. The spring member 85 is also formed with a rack gear 87 on its rear top surface.

The holder 4 is formed adjacent its front end with a vertical hole 88 in which a ball 16 such as a steel ball is loosely mounted so as to be vertically slidable. The ball 16 has its top and bottom in contact with the cutter 17 and the spring 86, respectively. When the spring 86 rebounds upwardly, it pushes up the front part of the cutter 17 through the balls 16. Thus, the cutter is caused to pivot about the pin 79 in such a manner that its edge 76 will cut into a work which is rotating in the direction of arrow in FIG. 12.

A pinion gear 89 mounted in a transverse hole formed in the holder 4 is in meshing engagement with the rack gear 87. A knob 90 is mounted on the shaft of the pinion gear 89 at one end thereof. By turning the knob 90, the pinion gear 89 rotates, causing the spring member 85 to slide back and forth. The bias of the spring 86 can be thus adjusted.

Numeral 91 designates an air nozzle screwed into a tapped hole formed in the intermediate portion of the brace 80.

In operation, the work 57 is rotated in the direction of the arrow of FIG. 12. When the cutter 17 cuts into the work with its edge 76, it will be pushed down to pivot on the pin 79. Pushed down by the cutter 17, the spring 86 rebounds to push the cutter on the front bottom surface through the ball 16, causing the cutter edge 76 to be pushed back upwardly.

During the cutting operation, the cutter edge 76 is vibrated with an extremely small amplitude. The microvibration at the edge travels to the ball 16 where it is amplified or remains relatively large compared to prior art devices by the repulsive force of the spring 86 and is transmitted back to the cutter edge 76.

In the above-described operation, while the amplitude of vibration at the edge of the cutter 76 is small, the spring 86 having a small spring constant vibrates so as to increase the amplitude relative to prior art devices of the cutter 17 through the ball 16.

When the gap a will reduce such that cutter 17 will abut holder 4, and amplitude increases to a certain level, the holder 4 will act as a spring having a large spring constant, suppressing the vibration of the cutter 17. This will make it possible to vibrate the cutter edge in uniform waveforms and thus to improve the cutting performance.

In this embodiment, the air nozzle 91 communicates with an airway leading to a source of pressurized air. A pressure detector means such as a pressure switch for detecting the fluctuation of air pressure is provided in the airway. The pressurized air is being blown out of the nozzle 91 into the gap b during cutting.

The pressurized air blown into the gap b can escape through both sides of the gap into the atmosphere as long as no abnormal state is encountered. The air pressure in the airway is also kept normal. But if the cutter 17 should be overloaded for some reason such as wear at the edge 76, it will pivot downwardly against the bias of the spring 86, thus narrowing the gap b. The air pressure in the airway thus rises, so that the pressure detector will operate to stop the cutting tool or to send out a warning.

FIG. 13 shows the fifth embodiment in which the cutter holder 4 is integrally provided on its front end with a cutter support 92. The cutter 17 is pivotally mounted on a pin 79 received in a transverse hole formed in the support 92.

The holder 4 is formed with a vertical hole near its front end at a position behind the cutter 17. A spring member 85 is inserted in the vertical hole and has its top end portion fixed by means of a setscrew at an adjustable vertical position.

The spring member 85 is formed in its bottom end with a longitudinal slot. The portion of the spring member 85 at the front side of the slot acts as a spring 86. The holder 4 is also formed with a hole in its front end in which is loosely mounted a ball 16 such as a steel ball having its front and rear ends in contact with the lower end of the back of the cutter 17 and spring 86, respectively.

The resilience of the spring 86 is adjustable by loosening the setscrew and moving the spring member 85 up and down.

An airway 93 extends in the holder 4 from its rear end to the vertical hole having the spring member 85 received therein. The airway 93 further communicates with the vertical slot formed in the spring member 85 through an air nozzle 91 formed in the rear half of the spring member 85 at its lower part.

In operation of the fifth embodiment, too, the work 57 is cut by causing the edge 76 of the cutter 17 to bite into it while rotating in the direction of arrow of FIG. 13. During cutting, the micro-vibration of the edge 76 is transmitted to the ball 16 where it is amplified or remains relatively large compared to prior art devices by the rebounding movement of the spring 86 and is transmitted back to the edge 76.

If the cutter should be overloaded, the spring member 85 is compressed so as to narrow its slot, thus actuating the pressure detector.

FIGS. 14 to 16 show the sixth embodiment which is a drill type tool for use with a drilling machine or the like. A holder 4 in the shape of a round bar is fixed to a live spindle of a drilling machine. A plurality of inserts or cutters 17 are mounted on its head. The holder 4 is formed in its front end face at both sides with grooves. A recess is formed in one of the side walls of each groove at the front end thereof so as to movably receive each cutter 17 therein.

Each cutter 17 is formed in one side thereof with a semi-spherical dent 96. In each groove is mounted a spring 86 having its rear end fixed and formed in its front portion at one side with a semi-spherical dent 95 so as to be opposed to the dent 96. A ball 16 is received in each opposed pair of dents 96 and 95. The cutter 17 is urged by the spring 86 against the bottom of the recess formed in the holder 4 so as to be pivotable about the front edge 98 of the recess against the bias of the spring 86.

The holder 4 is formed with a plurality of airways 99 communicating with air nozzles 91 in the recesses. The air nozzles are normally closed by the cutters 17.

In operation, a work is fixed on the table of a drilling machine. While rotating the holder 4, the cutters are caused to bite into the work. One of the cutters 17 cuts into the work and the bottom of a hole while the other one serves to cut the inner periphery of the hole formed by the leading cutter.

During cutting, micro-vibrations at the edge of the cutters are transmitted to the ball 16 and amplified or remains relatively large compared to prior art devices by the rebounding movement of the spring 86. The amplified vibrations are then carried back to the cutter edges.

In the above-described operation, while the cutters 17 are vibrating with a smaller amplitude, the springs 86 having a small spring constant vibrate, thus increasing the vibration of the cutters 17 through the balls 16.

When the cutters 17 begin to vibrate with a larger amplitude, the resistance of the springs 86 increases, suppressing the vibration of the cutters 17. Thus, the cutter edges can vibrate with uniform waveforms and the cutting performance will improve.

In this embodiment, a pressure detector is provided halfway in a circuit connecting each airway 99 to a source of pressurized air. The nozzles 91 are normally kept under air pressure during cutting. If the cutters are put under overloaded conditions, they will move to widen the gaps between the cutters and the bottom of the recesses, causing the pressurized air to be exhausted, thus actuating the pressure detectors.

The seventh embodiment shown in FIGS. 17 and 18 is applicable to an end mill type tool for use with a milling machine.

A round bar-shaped holder 4 is fixed to a live spindle of a milling machine. The holder 4 is formed in its periphery with a plurality of longitudinal grooves extending from its front end. Each groove is formed with a plurality of receses in one of its side walls so as to movably mount cutters 17 provided with balls.

In this embodiment, too, the vibration of the cutters 17 can be made uniform by the same action as in the fourth embodiment and thus the cutting performance improves. Though not shown, a device for detecting abnormality from changes in the pressure of pressurized air may be provided in this embodiment as with the other embodiments.

Though not shown in the drawings, the cutting tool of this embodiment may be provided with means for detecting the abnormal state of the cutting tools by detecting the fluctuation of air pressure as with the other embodiments.

By way of description, we assumed that the holder is rotatable with the spindle except for the fourth and fifth embodiments. But, the work may be rotatably mounted with the holder fixed.

What is claimed is:

1. A vibration cutting tool, comprising:
   a cutter holder having a cutter mounting portion;
   a cutter supported on said cutter mounting portion, with a gap remaining between said cutter and said cutter holder, wherein said cutter is vibratable microscopically when it engages a rotating workpiece and encounters a cutting resistance;
   a spring means supported on said cutter holder so as to be resiliently deformable when an edge of said cutter vibrates, thereby urging said cutter; and
   a ball disposed between said cutter and said spring means for transmitting vibrations between said cutter and said spring means;
   wherein said gap reduces such that said cutter abuts said cutter holder when the cutting resistance exceeds a predetermined value.

2. A vibration cutting tool as claimed in claim 1, wherein said spring means is disposed to be shiftable in a direction in which said cutting resistance acts on said cutter.

3. A vibration cutting tool as claimed in claim 1, further comprising:
   an air injection port connected with an air passage through which high-pressure air is fed, said air injection port means facing an outer periphery of said cutter; and
   a detector means for detecting a change in the pressure in said air passage and thus a change in a size of the gap between the cutter and the cutter mounting portion, thereby detecting an abnormal state during cutting operation based on the change in the pressure detected.

* * * * *